United States Patent
Hook et al.

[15] 3,663,032
[45] May 16, 1972

[54] HYDRAULIC DEPTH CONTROL FOR AGRICULTURAL IMPLEMENTS

[72] Inventors: Richard Wayne Hook, Des Moines; Virgil Dean Haverdink, Ankeny, both of Iowa

[73] Assignee: Deere & Company, Moline, Ill.

[22] Filed: Nov. 2, 1970

[21] Appl. No.: 85,996

[52] U.S. Cl. ........................280/43.23, 60/52 HE, 91/411 R
[51] Int. Cl. ..........................................................B62d 21/18
[58] Field of Search....................280/43.23; 60/52 HE, 52 R, 60/97 P; 91/411 R

[56] References Cited

UNITED STATES PATENTS

| | | | |
|---|---|---|---|
| 2,641,886 | 6/1953 | Graham | 280/43.23 |
| 3,240,506 | 3/1966 | McMullen | 280/43.23 |
| 3,356,383 | 12/1969 | Fay | 280/43.23 |
| 3,486,761 | 12/1969 | Fay | 280/43.23 |

Primary Examiner—Benjamin Hersh
Assistant Examiner—Robert R. Song
Attorney—H. Vincent Harsha, Harold M. Knoth, William A. Murray, John M. Nolan and Raymond L. Hollister

[57] ABSTRACT

An implement including pivotally interconnected and wheel supported main and outrigger frames which can be raised and lowered on the wheels by a plurality of hydraulic cylinders, there being a single cylinder connected between each outrigger frame and its respective wheel and a pair of cylinders connected between the main frame and its wheels with the single cylinders and one of the pair of cylinders being hydraulically connected in series and the pair of cylinders being hydraulically connected in parallel. By employing the pair of parallel cylinders, lift capacity is increased since one of the pair of cylinders operates to raise the main frame while the other of the pair of parallel cylinders passes fluid pressure onto the single cylinders to raise the outrigger frames.

22 Claims, 3 Drawing Figures

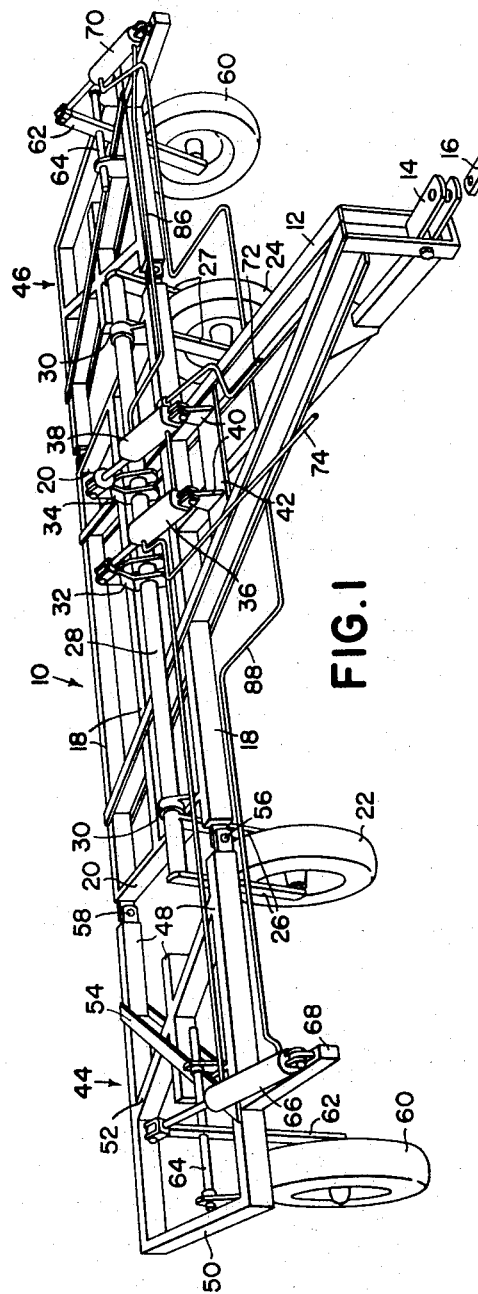
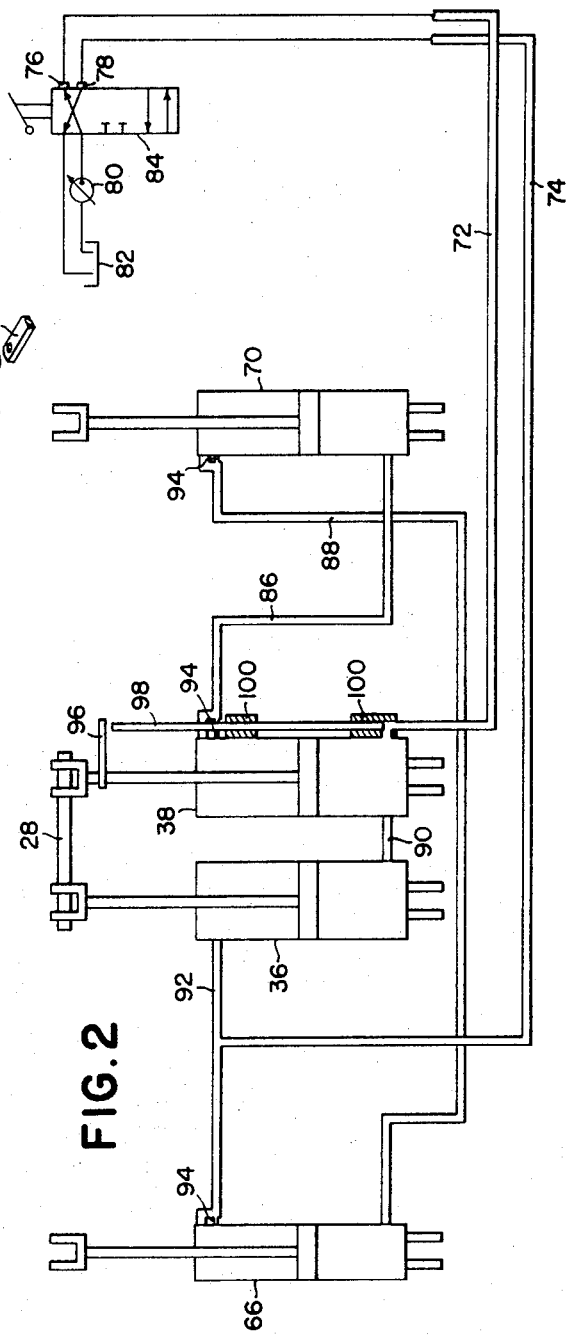
FIG.1
FIG.2
INVENTORS
R. W. HOOK
V. D. HAVERDINK

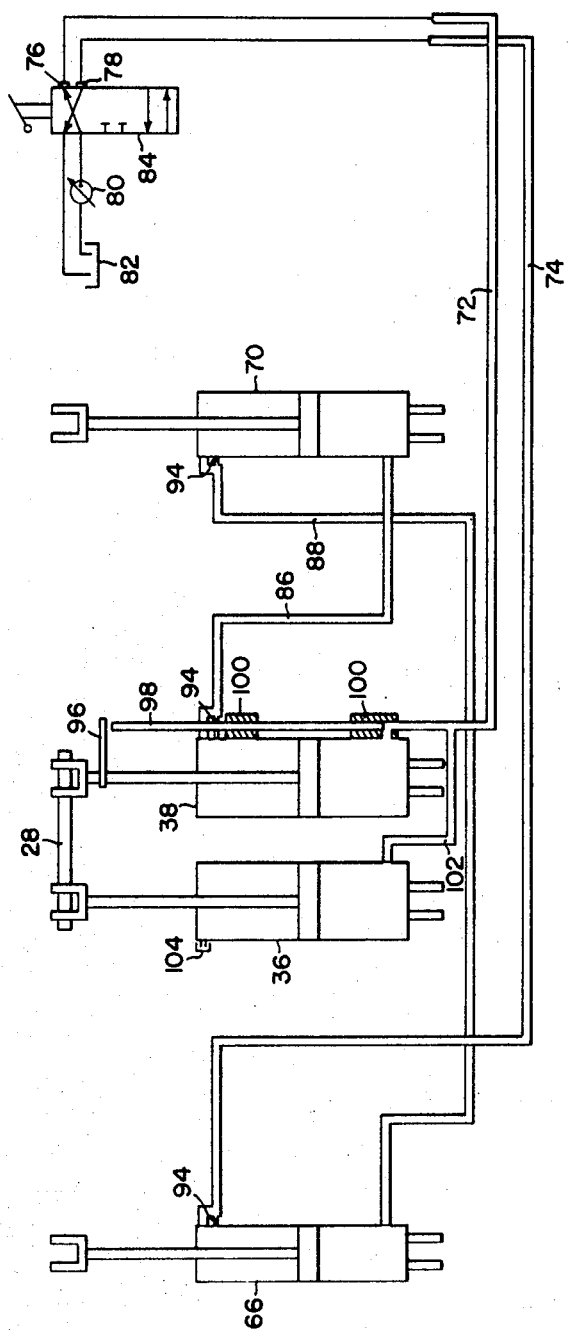

HYDRAULIC DEPTH CONTROL FOR AGRICULTURAL IMPLEMENTS

CROSS-REFERENCE TO RELATED APPLICATION

This application is an improvement over U.S. application Ser. No. 753,337 filed 23 July 1968.

BACKGROUND OF THE INVENTION

The present invention relates generally to agricultural machinery and more particularly relates to wheel-supported implements which are vertically movable on the wheels between raised transport and lowered gauged working positions.

In copending U.S. application Ser. No. 753,337 there is disclosed and claimed a hydraulic depth control system for agricultural implements which employs a plurality of serially connected hydraulic cylinders of matched displacement connected between the implement frame and its supporting wheels to raise and lower the frame on the wheels. In this system, extension or retraction of one of the cylinders is accompanied by equal and simultaneous extension or retraction, respectively, of the other cylinders so that all sections of the implement frame are raised and lowered simultaneously and through equal vertical distances.

The lift capacity of the hydraulic depth control system disclosed and claimed in the aforementioned application was limited by the available hydraulic pressure and the effective cross-sectional area of the first cylinder in the series since the fluid pressure times the area of the first cylinder in series must provide a force great enough to lift the entire implement. Thus, to acquire a greater lift capacity would appear to require an increase in the pressure of the fluid or an increase in the size of the first cylinder in series. It would not be practical to increase the pressure of the fluid since this would necessitate supplying the draft vehicles or tractors with pumps having a higher pressure capacity and the increased pressure may exceed the pressure rating the cylinders are designed to work under. If the size of the first cylinder in series is increased to obtain the greater lift capacity, it would be necessary to increase the size of all the cylinders in series in order to maintain matched displacement.

SUMMARY OF THE INVENTION

The principal object of the present invention is to provide means for increasing the lift capacity of a hydraulic depth control system for agricultural implements which utilizes hydraulic cylinders connected in series.

A more specific object of the present invention is to increase the lift capacity of a hydraulic depth control system for agricultural implements which utilizes the cylinders connected in series by providing an additional cylinder which is connected in parallel to the first cylinder in the series of cylinders when raising the implement.

Another object is to provide a simple and economical means for maintaining the lift capacity of a hydraulic depth control system for agricultural implements when reduced pressure is available.

An additional object of the present invention is to provide a hydraulic depth control system for multi-section flexible agricultural implements which utilizes a pair of cylinders hydraulically connected in parallel to raise and lower one section of the implement, the pair of cylinders being connected in series with additional cylinders utilized to raise and lower the other sections of the implement.

The above objects and additional objects and advantages of the present invention will become apparent along with the details of construction of preferred embodiments of the invention from a reading of the following detailed description when taken in conjunction with the accompanying drawings.

BRIEF DESCRIPTION OF THE DRAWINGS

In the drawings:

FIG. 1 is a perspective view of an implement provided with a hydraulic depth control system according to the present invention;

FIG. 2 is a schematic view of the hydraulic depth control system utilized on the implement shown in FIG. 1; and FIG. 3 is a view similar to FIG. 2 showing a slightly modified embodiment of the invention.

DESCRIPTION OF THE PREFERRED EMBODIMENT

In the following description, right-hand and left-hand reference is determined by standing at the rear of the implement and facing the direction of travel.

The implement with which the present invention is adapted to be associated is shown in FIG. 1 and includes a main central frame 10 having a forwardly extending draft frame 12 carrying at its forward end a clevis 14 which is adapted to be secured to a tractor drawbar 16. The main frame 10 includes a plurality of transversely extending toolbars 18 to which various implements, such as chisel plows, may be secured. The toolbars are interconnected by longitudinally extending side rails 20 and the rear ends of the draft frame 12. A pair of right and left ground-engaging wheels 22 and 24 are carried by downwardly extending rock arms 26 and 27 which are secured to the ends of a rockshaft 28 carried on the main frame by bearing blocks 30. An intermediate portion of the rockshaft 28 carries first and second pairs of upstanding rock arms 32 and 34. The anchor ends of a pair of extensible and retractable hydraulic cylinders 36 and 38 are pivotally connected to brackets 40 carried on an anchor plate 42 secured to the draft frame 12 and the rod ends thereof are pivotally connected to the first and second pairs of rock arms 32 and 34 respectively. Upon extension of the cylinders 36 and 38, the rockshaft 28 is rotated to raise the main frame 10 on the wheels 22 and 24, and upon retraction of the cylinders 36 and 38, the rockshaft 28 is rotated to lower the frame 10 on the wheels 22 and 24.

Right and left outrigger frames, indicated generally at 44 and 46, respectively, are substantially identical and each includes front, rear and intermediate toolbars 48 which are interconnected by a longitudinally extending outer strap 50 and cross braces 52 and 54. Each of the outrigger frames 44 and 46 is secured to the main frame 10 for pivotal movement about a longitudinally extending axis defined by front and rear pivot bolts 56 and 58. Each outrigger frame is supported by a wheel 60 carried at the lower end of a rock arm 62 secured to a rockshaft 64 journaled on the outrigger frame. A hydraulic cylinder 66 has its anchor end pivotally mounted to an anchor arm 68 rigid on the outrigger frame 44 and its rod ends pivotally connected to the upper end of the rock arm 62 on the outrigger frame 44. Similarly, a hydraulic cylinder 70 has its anchor end mounted on an anchor arm 68 rigid on the outrigger frame 46 and its rod end connected to the upper end of the rock arm 62 on the outrigger frame 46. Upon extension of the cylinders 66 and 70, the outrigger frames 44 and 46 are raised on the wheels 60 and upon retraction of the cylinders 66 and 70, the outrigger frames are lowered on the wheels 60.

In order to supply an exhaust fluid to and from the cylinders, fluid lines 72 and 74 are connected to the anchor end of the cylinder 38 and the rod end of the cylinder 66, respectively, and are also connected to conventional tractor remote cylinder outlets 76 and 78 which are interconnected with a pump 80 and a reservoir 82 on a tractor by means of a manually operated three-way valve 84. The rod end of the cylinder 38 is interconnected with the anchor end of the cylinder 70 by a fluid line 86 and the rod end of cylinder 70 is interconnected with the anchor end of cylinder 66 by a fluid line 88 so that the cylinders 38, 70 and 66 are connected in series with the cylinder 38 being the first in series. With the cylinders 38, 70 and 66 so connected, manipulation of the manual control valve 84 to the position illustrated in FIG. 2 will cause fluid pressure to flow from the pump 80 through the line 72 to the anchor end of the cylinder 38 to extend its rod. As the rod of the cylinder 38 is extended, fluid is displaced from the rod end thereof to the anchor end of the cylinder 70 to extend its rod, and similarly fluid from the rod end of the cylinder 70 is displaced to the anchor end of the cylinder 66 to extend its rod. Fluid from the rod end of the cylinder 66 is forced through the fluid line 74 to the reservoir 82. When the manual valve 84 is manipulated to interconnect the line 74 with the pump 80, fluid flows in the opposite direction to retract the rods of cylinders 66, 70 and 38 to lower the implement. The cylinders 38, 70 and 66 are of matched displacement so that these cylinders have equal extension and retraction.

The cylinder 36 is provided to increase the lift capacity of the depth control system, and to accomplish this, its anchor end is hydraulically connected in parallel with the anchor end of the cylinder 38 by a fluid line 90 and its rod end is connected to the fluid line 74 by still another fluid line 92. Since the anchor and rod ends of the cylinders 36 and 38 are secured to the same elements, mounting plate 42 and rockshaft 28, these cylinders are mechanically linked so they must be extended and retracted simultaneously and through equal distances. With the cylinder 36 so connected in the depth control system, fluid pressure supplied to the anchor end of cylinder 38 is also supplied to the anchor end of cylinder 36 so that the cylinder 36 aids the cylinder 38 in raising the center frame 10 with the result that a greater force is applied against the fluid in the rod end of the cylinder 38 and this increases the fluid pressure passed onto the cylinders 70 and 66. If the cylinder 36 is of a sufficient size so that the pressure supplied by the pump times the effective cross-sectional area of the anchor end of cylinder 36 provides the force required to lift the center frame 10, the pressure supplied to the cylinder 70 can actually be greater than the pressure supplied by the pump 80 due to the area differential between the anchor and rod ends of the cylinder 38.

Each of the cylinders 38, 70 and 66 is provided with a fluid bypass passage 94 which will permit fluid to flow through the cylinders when they are fully extended. The bypass passages provide for synchronization of the cylinders each time the implement is fully raised and also simplify the task of initially charging the cylinders and fluid lines with fluid, all as more fully explained in the previously mentioned U.S. application Ser. No. 753,337. The cylinder 36 is not provided with a bypass passage since it is not included in the series and since the mechanical link between the cylinders 36 and 38 requires that the cylinder 36 be constantly synchronized with the cylinder 38.

The cylinder 38 is also provided with an integral adjustable stop mechanism which includes an abutment member 96 adjustably carried on the rod of the cylinder 38 and a stop rod 98 slidably carried by supports 100 secured to the cylinder 38. If the rod of the cylinder 38 is retracted so that the abutment 96 contacts the stop rod 98, additional retraction will cause the opposite end of the stop rod to move into and obstruct the passage from the anchor end of the cylinder 38 to prevent further exhaust of fluid from the anchor end of the cylinder 38. When the exhaust of fluid from the anchor end of the cylinder 38 is blocked, the exhaust of fluid from the anchor ends of all the other cylinders is also blocked and additional lowering movement of the implement is prevented. When the pump 80 is again interconnected with the fluid line 72, the fluid pressure in line 72 will move the rod 98 from the passage to the anchor end of cylinder 38 so that fluid is free to flow into the anchor end of cylinder 38. The adjustable stop mechanism provides a convenient method of establishing a predetermined maximum working depth other than that determined by full retraction of the cylinders. Of course the position of the implement on the ground wheels can be determined without the use of the stop mechanism by merely moving the valve 84 to its neutral position when the implement has been raised or lowered to the desired position.

A slightly modified form of depth control system is illustrated in FIG. 3 and differs from that illustrated in FIG. 2 in two respects. First, the anchor end of the cylinder 36 is not connected to the anchor end of the cylinder 38, but is connected directly to the fluid line 72 by a fluid line 102. This arrangement has the advantage of eliminating the need for the third port in the cylinder 38, and the cylinder 38 can then be identical to that used in the hydraulic lift system disclosed and claimed in the aforementioned U.S. application. However, the use of this arrangement is limited to those cases where the weight of the entire implement can be supported entirely by the cylinder 38 when the implement is lowered to the position determined by the abutment 96 since the cylinder 36 does not help support the implement in this situation. The second difference is that the rod end of the cylinder 36 is not connected to the fluid line 74, but is merely provided with a breather 104. The use of the breather 104 eliminates the need for the fluid line 92 used in the embodiment illustrated in FIG. 2, and in effect makes the cylinder 36 a single-acting cylinder. However, the use of the breather 104 is limited to those cases where very little hydraulic pressure is required to retract the cylinders.

From the foregoing descriptions of construction and operation of two preferred embodiments of the invention, it can be seen that the present invention provides an extremely simple, efficient and economical means of increasing the lift capacity of a hydraulic depth control system for agricultural implements which employs a plurality of hydraulic cylinders connected in series, and that the present invention makes it possible to use the depth control systems for relatively small implements on larger implements with very few modifications or to use a tractor with a low pressure source to raise and lower an implement which previously required a tractor with a high pressure source.

Having thus described two preferred embodiments of the invention, various additions and modifications will become apparent to those skilled in the art, and these additions and modifications can be made without departing from the underlying principles of the invention. Therefore, the invention should not be limited to the specific illustrated embodiments, but should be limited only by the scope of the following claims.

We claim:

1. An implement comprising: a frame; at least two supporting structures mounted on the frame for independent movement; at least two extensible and retractable hydraulic cylinders mounted on the frame and operatively connected to the supporting structures to raise and lower the frame on the supporting structures through a vertical range between upper and lower limits; first fluid line means extending between and interconnecting the hydraulic cylinders in series; second fluid line means connected to one end of the first cylinder in series and being alternately connectible to a source of fluid pressure and a fluid reservoir; an additional hydraulic cylinder mounted on the frame and operatively connected to the supporting structure to which the first cylinder in series is connected; and third fluid line means extending between and affording a parallel relation between the additional hydraulic cylinder and the first hydraulic cylinder in series.

2. The implement set forth in claim 1 wherein the first hydraulic cylinder in series and the additional hydraulic cylinder are mechanically linked for equal and simultaneous extension and retraction.

3. The implement set forth in claim 2 wherein the hydraulic cylinders in series are of matched displacement, the second fluid line means is connected to the anchor end of the first cylinder in series, the first cylinder in series is provided with adjustable stop means to prevent the exhaust of fluid from the first cylinder in series through the second fluid line means when the first cylinder in series is retracted a predetermined distance.

4. The implement set forth in claim 3 wherein the third fluid line means extends between and interconnects the anchor ends of the additional hydraulic cylinder and the first hydraulic cylinder in series.

5. The implement set forth in claim 4 wherein the first fluid line means interconnects the rod end of each cylinder in series except the last cylinder in series with the anchor end of the next adjacent cylinder in series, and fourth fluid line means interconnects the rod ends of the additional hydraulic cylinder and the last cylinder in series and is connectible to a source of fluid pressure when the second fluid line means is connected to a fluid reservoir and to a fluid reservoir when the second fluid line means is connected to a source of fluid pressure.

6. The implement set forth in claim 5 wherein the rod end of each cylinder except the additional cylinder is provided with a bypass circuit which affords free flow of fluid through the cylinder when the cylinder is fully extended.

7. The implement set forth in claim 2 wherein the cylinders in series are of matched displacement, fourth fluid line means is connected to one end of the last hydraulic cylinder in series and is connectible to a source of fluid pressure when the second fluid line means is connected to a fluid reservoir and to a fluid reservoir when the second fluid line means is connected to a source of fluid pressure, and each of the cylinders except the additional cylinder is provided with a bypass circuit at one end which affords free flow of fluid through each of the cylinders in series from the second to the fourth fluid line means when each of the cylinders in series is at one end of its stroke.

8. The implement set forth in claim 7 wherein the anchor ends of the additional hydraulic cylinder and the first hydraulic cylinder in series are mounted on the frame and their rod ends are connected to the respective supporting structure, the second fluid line means is connected to the anchor end of the first hydraulic cylinder in series and the third fluid line means extends between and interconnects the anchor end of the additional hydraulic cylinder and the second fluid line means.

9. The implement set forth in claim 7 wherein the first hydraulic cylinder in series is provided with an adjustable stop means which prevents the exhaust of fluid from the first cylinder in series through the second fluid line means when the first cylinder in series is retracted a predetermined distance.

10. An implement comprising: a frame; a plurality of supporting structures mounted on the frame for independent movement; a pair of extensible and retractable hydraulic cylinders hydraulically connected in parallel and connected between the frame and one of the supporting structures to raise and lower the frame on the one supporting structure through a vertical range between upper and lower limits; single extensible and retractable hydraulic cylinders connected between the frame and each of the other supporting structures to raise and lower the frame through the vertical range; fluid line means connecting the single hydraulic cylinders in series with each other and in series with one of the pair of hydraulic cylinders; and additional fluid line means having one end connected to the pair of cylinders and another end connectible alternately to a source of fluid pressure and a fluid reservoir.

11. An implement comprising: a plurality of rigid frame sections connected in side-by-side relationship for pivotal movement of each section with respect to an adjacent section; wheel means secured to each of the sections for vertical adjustment with respect thereto, a pair of hydraulic cylinders hydraulically connected in parallel and connected between one of the frame sections and its respective wheel means for vertically adjusting the one section through a vertical range between upper and lower limits; first fluid line means having one end connected to the pair of cylinders and another end connectible alternately to a source of fluid pressure and a fluid reservoir; a plurality of single hydraulic cylinders connected between the other sections and their respective wheel means; and second fluid line means connecting the single hydraulic cylinders in series with each other and with one of the pair of hydraulic cylinders.

12. The implement set forth in claim 11 wherein the pair of hydraulic cylinders are mechanically linked for equal and simultaneous extension and retraction.

13. The implement set forth in claim 12 wherein adjustable stop means is provided on one of the pair of hydraulic cylinders to prevent the exhaust of fluid from the pair of hydraulic cylinders through the first fluid line means when the last-mentioned one hydraulic cylinder has been retracted a predetermined distance.

14. The implement set forth in claim 12 wherein adjustable stop means is provided on the one of the pair of hydraulic cylinders which is serially connected to the single hydraulic cylinders to prevent the exhaust of fluid from the one of the pair of hydraulic cylinders through the first fluid line means when the one of the pair of hydraulic cylinders has been retracted a predetermined distance.

15. An implement comprising: a plurality of rigid frame sections connected in side-by-side relationship for pivotal movement of each section with respect to an adjacent section; wheel means secured to each of the sections for vertical adjustment with respect thereto; hydraulic cylinder means connected to each of the sections and the respective wheel means for vertically adjusting the sections through a vertical range between upper and lower limits; fluid line means connecting the cylinder in series; additional fluid line means having one end connected to one of the cylinders and another end adapted to be connected to a source of fluid pressure; an additional hydraulic cylinder connected to the section and wheel means to which the one cylinder is connected; and further fluid line means connecting the one hydraulic cylinder and the additional hydraulic cylinder in parallel.

16. The implement set forth in claim 15 wherein the one hydraulic cylinder and the additional hydraulic cylinder are mechanically linked for equal and simultaneous extension and retraction.

17. The implement set forth in claim 16 wherein the cylinders in series are of matched displacement, the one end of the additional fluid line means is connected to the anchor end of the one hydraulic cylinder, and adjustable stop means is provided on the one hydraulic cylinder to prevent the exhaust of fluid from the one hydraulic cylinder through the additional fluid line means when the one hydraulic cylinder has been retracted to a predetermined position.

18. The implement set forth in claim 17 wherein the further fluid line means extends between and interconnects the anchor ends of the one hydraulic cylinder and the additional hydraulic cylinder.

19. The implement set forth in claim 17 wherein the further fluid line means has one end connected to the anchor end of the additional hydraulic cylinder and another end connected to the additional fluid line means.

20. An implement comprising: a plurality of rigid frame sections connected in side-by-side relationship for pivotal movement of each section with respect to an adjacent section about a generally longitudinally extending axis; means including hydraulic means operatively connected to each of the sections for vertically adjusting each of the respective sections with respect to the ground surface through a vertical range between upper and lower limits; hydraulic conduit means extending between and affording a series relation between the hydraulic means; the means connected to at least two of the sections for vertically adjusting the sections including ground wheels mounted on the sections for vertical adjustment with respect thereto and the hydraulic means included with the latter means including extensible and retractable hydraulic cylinders that are connected to their respective sections and respective ground wheels for vertically adjusting their respective sections; the hydraulic conduit means connecting the cylinders in series with one another; an additional hydraulic cylinder mounted on one of the at least two sections and connected between the one section and its respective ground wheel for vertically adjusting the section; and additional hydraulic conduit means extending between and affording a parallel relation between the two hydraulic cylinders on the one section.

21. The implement set forth in claim 20 wherein the two hydraulic cylinders on the one section are mechanically linked for equal and simultaneous extension and retraction.

22. The implement set forth in claim 21 wherein the cylinders in series are of matched displacement and each is provided with bypass passage means which affords free flow of fluid through the cylinder when the cylinder is moved to its limit in one direction, and the cylinder in series on the one section is the first cylinder in the series when raising the sections.

* * * * *